(12) United States Patent
Blumberg et al.

(10) Patent No.: US 9,002,371 B1
(45) Date of Patent: *Apr. 7, 2015

(54) POSITION-BASED INFORMATION ACCESS DEVICE AND METHOD OF SEARCHING

(75) Inventors: Brad W. Blumberg, Voorhees, NJ (US); Eric M. Blumberg, Miami, FL (US)

(73) Assignee: Smarter Agent, LLC, Camden, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/592,411

(22) Filed: Aug. 23, 2012

Related U.S. Application Data

(63) Continuation of application No. 11/426,497, filed on Jun. 26, 2006, now abandoned, which is a continuation of application No. 09/774,119, filed on Jan. 31, 2001, now Pat. No. 7,072,665, which is a continuation-in-part of application No. 09/639,265, filed on Aug. 15, 2000, now Pat. No. 6,385,541.

(60) Provisional application No. 60/186,155, filed on Feb. 29, 2000.

(51) Int. Cl.
| | | |
|---|---|---|
| H04W 24/00 | (2009.01) | |
| H04W 4/02 | (2009.01) | |
| H04L 29/08 | (2006.01) | |

(52) U.S. Cl.
CPC ............. *H04W 4/028* (2013.01); *H04L 67/306* (2013.01)

(58) Field of Classification Search
CPC ... H04W 64/00; H04W 4/02; H04L 29/08657
USPC ........................ 455/456.1, 404.2, 414.1, 414.2
See application file for complete search history.

(56) References Cited

U.S. PATENT DOCUMENTS

| | | | |
|---|---|---|---|
| 5,032,989 | A | 7/1991 | Tornetta |
| 5,058,009 | A | 10/1991 | Yoshino et al. |
| 5,424,524 | A | 6/1995 | Ruppert et al. |
| 5,584,025 | A | 12/1996 | Keithley et al. |
| 5,594,425 | A | 1/1997 | Ladner et al. |
| 5,682,525 | A | 10/1997 | Bouve et al. |
| 5,684,859 | A | 11/1997 | Chanroo et al. |
| 5,794,216 | A | 8/1998 | Brown |
| 5,802,492 | A | 9/1998 | DeLorme et al. |
| 5,831,664 | A | 11/1998 | Wharton et al. |
| 5,850,433 | A | 12/1998 | Rondeau |
| 5,852,810 | A | 12/1998 | Sotiroff |
| 5,901,214 | A | 5/1999 | Shaffer et al. |
| 5,930,699 | A | 7/1999 | Bhatia |

(Continued)

FOREIGN PATENT DOCUMENTS

| | | |
|---|---|---|
| GB | 2357167 | 6/2001 |
| JP | 7-65070 | 3/1995 |

OTHER PUBLICATIONS

Office Action for U.S. Appl. No. 09/639,265, mailed on May 29, 2001, 7 pages.

(Continued)

*Primary Examiner* — Nghi H Ly

(57) ABSTRACT

A system and method retrieve location-centric information. The method includes providing geographic position information of a wireless device to an information system or database and receiving location identifiers based on the geographic position. Each location identifier has related location-centric information that can be viewed by the user of the wireless device.

6 Claims, 6 Drawing Sheets

(56) References Cited

U.S. PATENT DOCUMENTS

| | | | |
|---|---|---|---|
| 5,938,721 A | 8/1999 | Dussell et al. | |
| 5,944,769 A | 8/1999 | Musk et al. | |
| 5,970,478 A | 10/1999 | Walker et al. | |
| 6,009,413 A | 12/1999 | Webber et al. | |
| 6,014,645 A | 1/2000 | Cunningham | |
| 6,029,069 A | 2/2000 | Takaki | |
| 6,091,956 A * | 7/2000 | Hollenberg | 455/456.5 |
| 6,115,611 A | 9/2000 | Kimoto et al. | |
| 6,115,690 A | 9/2000 | Wong | |
| 6,122,520 A | 9/2000 | Want et al. | |
| 6,202,023 B1 | 3/2001 | Hancock et al. | |
| 6,321,202 B1 | 11/2001 | Raveis, Jr. | |
| 6,343,275 B1 | 1/2002 | Wong | |
| 6,343,317 B1 | 1/2002 | Glorikian | |
| 6,385,541 B1 * | 5/2002 | Blumberg et al. | 701/484 |
| 6,385,622 B2 | 5/2002 | Bouve et al. | |
| 6,415,291 B2 | 7/2002 | Bouve et al. | |
| 6,456,852 B2 | 9/2002 | Bar et al. | |
| 6,460,036 B1 | 10/2002 | Herz | |
| 6,484,176 B1 | 11/2002 | Sealand et al. | |
| 6,496,776 B1 * | 12/2002 | Blumberg et al. | 701/516 |
| 6,522,875 B1 * | 2/2003 | Dowling et al. | 455/414.3 |
| 6,522,889 B1 | 2/2003 | Aarnio | |
| 6,542,812 B1 | 4/2003 | Obradovich et al. | |
| 6,552,682 B1 | 4/2003 | Fan | |
| 6,564,143 B1 | 5/2003 | Alewine et al. | |
| 6,578,010 B1 | 6/2003 | Teacherson | |
| 6,587,835 B1 | 7/2003 | Treyz et al. | |
| 6,594,633 B1 | 7/2003 | Broerman | |
| 6,625,457 B1 | 9/2003 | Raith | |
| 6,636,803 B1 | 10/2003 | Hartz, Jr. et al. | |
| 6,650,902 B1 | 11/2003 | Richton | |
| 6,684,196 B1 | 1/2004 | Mini et al. | |
| 6,836,667 B1 | 12/2004 | Smith, Jr. | |
| 6,871,140 B1 | 3/2005 | Florance et al. | |
| 6,873,850 B2 | 3/2005 | Dowling et al. | |
| 6,898,434 B2 | 5/2005 | Pradhan et al. | |
| 6,912,507 B1 | 6/2005 | Phillips et al. | |
| 6,973,432 B1 | 12/2005 | Woodard et al. | |
| 7,024,205 B1 | 4/2006 | Hose | |
| 7,069,238 B2 | 6/2006 | I'Anson et al. | |
| 7,072,665 B1 * | 7/2006 | Blumberg et al. | 455/456.1 |
| 7,127,261 B2 | 10/2006 | Van Erlach | |
| 7,136,634 B1 * | 11/2006 | Rissanen et al. | 455/422.1 |
| 7,227,498 B2 | 6/2007 | Soliman | |
| 7,457,628 B2 | 11/2008 | Blumberg et al. | |
| 7,487,114 B2 | 2/2009 | Florance et al. | |
| 7,523,041 B2 | 4/2009 | Chen et al. | |
| 7,583,607 B2 | 9/2009 | Steele et al. | |
| 7,599,795 B1 * | 10/2009 | Blumberg et al. | 701/426 |
| 7,620,570 B2 | 11/2009 | Albazz et al. | |
| 7,801,771 B1 | 9/2010 | Sirota et al. | |
| 7,987,113 B2 | 7/2011 | Blumberg et al. | |
| 8,442,550 B2 | 5/2013 | Blumberg et al. | |
| 8,473,199 B2 | 6/2013 | Blumberg et al. | |
| 8,731,581 B2 | 5/2014 | Blumberg et al. | |
| 2001/0047282 A1 | 11/2001 | Raveis, Jr. | |
| 2002/0013852 A1 | 1/2002 | Janik | |
| 2002/0035609 A1 | 3/2002 | Lessard et al. | |
| 2002/0052814 A1 | 5/2002 | Ketterer | |
| 2002/0065739 A1 | 5/2002 | Florance et al. | |
| 2002/0069148 A1 | 6/2002 | Mutschler et al. | |
| 2002/0077966 A1 | 6/2002 | Harycki et al. | |
| 2002/0091854 A1 | 7/2002 | Smith | |
| 2002/0111890 A1 | 8/2002 | Sloan et al. | |
| 2002/0152100 A1 | 10/2002 | Chen et al. | |
| 2002/0198779 A1 | 12/2002 | Rowen et al. | |
| 2003/0014402 A1 | 1/2003 | Sealand et al. | |
| 2003/0069029 A1 | 4/2003 | Dowling et al. | |
| 2003/0083957 A1 | 5/2003 | Olefson | |
| 2003/0092450 A1 | 5/2003 | Juppi et al. | |
| 2003/0200108 A1 | 10/2003 | Malnoe | |
| 2004/0139049 A1 | 7/2004 | Hancock et al. | |
| 2005/0059410 A1 | 3/2005 | Trossen et al. | |
| 2005/0149419 A1 | 7/2005 | Blumberg et al. | |
| 2005/0230472 A1 | 10/2005 | Chang | |
| 2006/0006990 A1 | 1/2006 | Obradovich | |
| 2006/0106674 A1 | 5/2006 | Muller | |
| 2006/0190325 A1 | 8/2006 | Tarsh | |
| 2007/0005481 A1 | 1/2007 | Kedia et al. | |
| 2007/0032247 A1 | 2/2007 | Shaffer et al. | |
| 2007/0038761 A1 | 2/2007 | Tebeka | |
| 2007/0050263 A1 | 3/2007 | Horimoto | |
| 2007/0069923 A1 | 3/2007 | Mendelson | |
| 2007/0073546 A1 | 3/2007 | Kehren | |
| 2011/0055247 A1 | 3/2011 | Blumberg et al. | |
| 2013/0290331 A1 | 10/2013 | Blumberg et al. | |
| 2014/0229315 A1 | 8/2014 | Blumberg et al. | |

OTHER PUBLICATIONS

Office Action for U.S. Appl. No. 09/639,265, mailed on Oct. 3, 2001, 5 pages.
Office Action for U.S. Appl. No. 09/774,120, mailed on Nov. 19, 2001, 6 pages.
Office Action for U.S. Appl. No. 09/774,119, mailed on Oct. 24, 2003, 14 pages.
Office Action for U.S. Appl. No. 09/774,119, mailed on Jul. 27, 2004, 13 pages.
Office Action for U.S. Appl. No. 11/426,497, mailed on Feb. 17, 2009, 8 pages.
Office Action for U.S. Appl. No. 11/426,497, mailed on Aug. 12, 2009, 6 pages.
Office Action for U.S. Appl. No. 11/426,497, mailed on Dec. 16, 2009, 6 pages.
Office Action for U.S. Appl. No. 11/426,497, mailed on Jun. 7, 2010, 7 pages.
Office Action for U.S. Appl. No. 11/426,497, mailed Sep. 7, 2011, 12 pages.
Office Action for U.S. Appl. No. 11/426,497, mailed Feb. 24, 2012, 13 pages.
Office Action for U.S. Appl. No. 10/644,060, mailed on Jun. 3, 2005, 11 pages.
Office Action for U.S. Appl. No. 10/644,060, mailed on Dec. 1, 2005, 14 pages.
Office Action for U.S. Appl. No. 10/644,060, mailed on Mar. 23, 2006, 14 pages.
Office Action for U.S. Appl. No. 10/644,060, mailed on Dec. 15, 2006, 18 pages.
Office Action for U.S. Appl. No. 10/644,060, mailed on Dec. 12, 2007, 18 pages.
Office Action for U.S. Appl. No. 10/644,060, mailed on Jun. 5, 2008, 28 pages.
Office Action for U.S. Appl. No. 12/275,683, mailed on Apr. 8, 2011, 12 pages.
Office Action for U.S. Appl. No. 12/275,683, mailed on May 15, 2012, 24 pages.
Final Office Action for U.S. Appl. No. 12/275,683, mailed on Dec. 7, 2012, 16 pages.
Office Action for U.S. Appl. No. 11/249,733, mailed on Jun. 25, 2008, 7 pages.
Office Action for U.S. Appl. No. 11/249,733, mailed on Feb. 10, 2009, 7 pages.
Office Action for U.S. Appl. No. 12/573,537, mailed on Jul. 18, 2012, 5 pages.
Request for Inter Partes Reexamination Serial No. 95/001,435 of US Patent No. 6,385,541, filed on Aug. 31, 2010, 46 pages.
Office Action for Inter Partes Reexamination Serial No. 95/001,435 of US Patent No. 6,385,541, mailed on Dec. 21, 2010, 17 pages.
Response Under 37 CFR 1.111 and Proposed Amendment Under 37 CFR 1.530 and 37 CFR 1.943, Inter Partes Reexamination Serial No. 95/001,435 of US Patent No. 6,385,541, dated Feb. 22, 2011, 61 pages.
Third Party Requesters' Comments Subsequent to Patent Owner's Response Under 37 CFR § 1.947 Inter Partes Reexamination Serial No. 95/001,435 of US Patent No. 6,385,541, filed on Mar. 24, 2011, 50 pages.

(56) References Cited

OTHER PUBLICATIONS

Action Closing Prosecution of Inter Partes Reexamination of US Patent No. 6,496,541, Control No. 95/001,435, mailed Nov. 10, 2011, 51 pages.
Patent Owner Comments Under 37 CFR § 1.951(a) for Inter Partes Reexamination of US Patent No. 6,496,541, Control No. 95/001,435, filed Nov. 17, 2011, 34 pages.
Declaration of John Moring submitted with Patent Owner Comments on Nov. 17, 2011 in Inter Partes Reexamination of US Patent No. 6,496,541, Control No. 95/001,435, 23 pages.
Right of Appeal Notice Under 37 CFR 1.953 for Inter Partes Reexamination Serial No. 95/001,435, mailed on May 24, 2013, 66 pages.
Request for Inter Partes Reexamination Serial No. 95/001,436 of US Patent No. 7,072,665, filed on Aug. 31, 2010, 55 pages.
Office Action for Inter Partes Reexamination Serial No. 95/001,436 of US Patent No. 7,072,665, mailed on Dec. 21, 2010, 17 pages.
Response Under 37 CFR 1.111 and Proposed Amendment Under 37 CFR 1.530 and 37 CFR 1.943, Inter Partes Reexamination Serial No. 95/001,436 of US Patent No. 7,072,665, dated Feb. 22, 2011, 52 pages.
Third Party Requesters' Comments Under 37 CFR 1.947, filed on Apr. 9, 2012, 44 pages.
Action Closing Prosecution of Inter Partes Reexamination of US Patent No. 7,072,665, Control No. 95/001,436, mailed Oct. 10, 2012, 58 pages.
Patent Owner's Comments Under 37 CFR 1.951(a), filed on Nov. 13, 2012, 73 pages.
Third Party Requesters' Comments Under 37 CFR 1.951(b) for Inter Partes Reexamination of US Patent No. 7,072,665, Control No. 95/001,436, filed on Dec. 13, 2012, 49 pages.
Right of Appeal Notice Under 37 CFR 1.953 for Inter Partes Reexamination Serial No. 95/001,436, mailed on Jun. 20, 2013, 55 pages.
Request for Inter Partes Reexamination Serial No. 95/001,437 of US Patent No. 6,496,776, filed on Sep. 1, 2010, 55 pages.
Office Action for Inter Partes Reexamination Serial No. 95/001,437 of US Patent No. 6,496,776, mailed on Dec. 21, 2010, 22 pages.
Response Under 37 CFR 1.111 and Proposed Amendment Under 37 CFR 1.530 and 37 CFR 1.943, for Inter Partes Reexamination Serial No. 95/001,437 of US Patent No. 6,496,776, dated Feb. 22, 2011, 40 pages.
Third Party Requesters' Comments Subsequent to Patent Owner's Response Under 37 CFR § 1.947 for Inter Partes Reexamination Serial No. 95/001,437 of US Patent No. 6,496,776, filed on Mar. 24, 2011, 46 pages.
Action Closing Prosecution of Inter Partes Reexamination of US Patent No. 6,496,776, Control No. 95/001,437, mailed Nov. 18, 2011, 46 pages.
Patent Owner Comments Under 37 CFR § 1.951(a) for Inter Partes Reexamination of US Patent No. 6,496,776, Control No. 95/001,437, filed Dec. 19, 2011, 23 pages.
Declaration of John Moring submitted with Patent Owner Comments on Dec. 19, 2011 in Inter Reexamination of US Patent No. 6,496,776, Control No. 95/001,437, 24 pages.
Third Party Requesters' Comments Subsequent to Patent Owner's Response Under 37 CFR § 1.947 Inter Partes Reexamination of US Patent No. 6,496,776, Control No. 95/001,437, filed Jan. 18, 2012, 30 pages.
Right of Appeal Notice Under 37 CFR 1.953 for Inter Partes Reexamination Serial No. 95/001,437, mailed on Oct. 1, 2012, 61 pages.
Cross-Appeal Brief of Third-Party Requesters in Inter Partes Reexamination, filed on Jan. 11, 2013, 44 pages.
Patent Owner's Appellant's Brief in Inter Partes Reexamination, filed on Jan. 14, 2013, 40 pages.
Patent Owner's Respondent's Brief in Inter Partes Reexamination, filed on Feb. 11, 2013, 15 pages.
Respondents' Brief of Third-Party Requesters in Inter Partes Reexamination, filed on Feb. 14, 2013, 26 pages.
Inter Partes Reexamination Examiner's Answer in Inter Partes Reexamination of US Patent No. 6,496,776, Control No. 95/001,437, mailed on Mar. 28, 2013, 7 pages.
Patent Owner's Rebuttal Brief for Inter Partes Reexamination of U.S. Patent No. 6,496,776, Control No. 95/001,437, filed on Apr. 29, 2013, 15 pages.
Rebuttal Brief of Cross-Appellant Third-Party Requesters in Inter Partes Reexamination of US Patent No. 6,496,776, Control No. 95/001,437, filed of Apr. 29, 2013, 16 pages.
"SnapTrack Awarded Patent for Locating or Tracking Wireless Devices Via Internet and Client-Server-Based Computer Networks",http://famulus.msnbc.com/famuluscom/businesswire01-23-050325.asp?sym=QCOM, Jan. 23, 2001, 4 pages.
"Lucent Technologies and Profilium Inc. Announce Alliance Agreement to Deploy Advanced Location-Based Mobile Advertising Solution", http://www.hoovershbn.hoovers.com/bin/story?StoryId=CoM0p0bKbytiXmdi&FQ=c....%20L Jan. 23, 2001, 3 pages.
"The Meaning of Telematics", http://www.globaltelematics.com/telematics.htm, Oct. 30, 2000, 2 pages.
HomeFinder—Find the Home That's Right for You from, [Retrieved on Mar. 9, 2001]. Retrieved from the Internet:< http://www.homefinder.com, 1 page.
HomeScape.com—Buying, [Retrieved on Mar. 9, 2001]. Retrieved from the Internet:< http://www.homescape.com/buying/, 1 page.
zipRealty.com: The zipRealty.com Buyer's Advantage, [Retrieved on Mar. 9, 2001]. Retrieved from Internet:<http://www.ziprealty.com/buy_a_home/advantage.jsp, 3 pages.
Homes for Sale—MSN HomeAdvisor,[Retrieved on Mar. 9, 2001]. Retrieved from the Internet:<http://homeadvisor.msn.com/homes/overview.asp, 2 pages.
Realtor.com: Real Estate—Find a new home and a realtor, [Retrieved on Mar. 9, 2001]. Retrieved from the Internet:<http://www.realtor.com/FindHome/default.asp, 3 pages.
Realtor.com: Real Estate—Homes for Sale in New Jersey, [Retrieved on Mar. 9, 2001]. Retrieved from the Internet:<http://www.realtor.com/newjersey/nbselnj.asp, 2 pages.
Realtor.com: Real Estate—Homes for Sale in Atlantic City, [Retrieved on Mar. 9, 2001]. Retrieved from the Internet:<http://www.realtor.com/atlanticcity/nbregion4.asp, 2 pages.
Realtor.com: Find a Home—Select Property Type, [Retrieved on Mar. 9, 2001]. Retrieved from the Internet:<http://www.realtor.com/PropType.asp?pgnum=1&st=nj&frm=bycomm&mls=atlanticcity&mlsttl=Atlantic+City&comm, 3 pages.
Realtor.com: Real Estate in Bay Area, [Retrieved on Mar. 9, 2001]. Retrieved from the Internet:<http://www.realtor.com/selectnb.asp?frm=bycomm&st=nj&mls=atlanticcity&mlsttl=Atlantic+City&comm=Bay+Area&, 3 pages.
Realtor.com: Real Estate—Find a Neighborhood, [Retrieved on Mar. 9, 2001]. Retrieved from the Internet:<http://www.realtor.com/FindNeig/default.asp, 3 pages.
Hamit, F. "A GIS/GPS System for Fire and EMS Dispatch: Imaging Enabled" Advanced Energy, 1997, 5 pages.
O'Grady, M.J. et al. "A Tourist-Centrist Mechanism for Interacting with the Environment" 1st International Workshop on Managing Interactions and Smart Environments, Dec. 1999, 12 pages.
Broadbent, J. et al. "Location Aware Mobile Interactive Guides: Usability Issues." in: Bearman, D. et al. *Museum Interactive Multimedia 1997: Cultural Heritage Systems Design and Interfaces*, Sep. 3-5, 1997, 20 pages.
G.D. Abowd et al. "Cyberguide: A mobile context-aware tour guide", Wireless Networks, Oct. 1997, vol. 3, Issue 5, 13 pages.
Office Action for U.S. Appl. No. 13/892,501, mailed on Jul. 18, 2013, 22 pages.
Cross-Appeal Brief of Third-Party Requesters in Inter Partes Reexamination of U.S. Patent No. 6,385,541, Control No. 95/001,435, filed on Aug. 28, 2013, 35 pages.
Patent Owner's Appellant's Brief for Inter Partes Reexamination of U.S. Patent No. 6,385,541, Control No. 95/001,435, filed on Aug. 28, 2013, 64 pages.
Patent Owner's Respondent's Brief in Inter Partes Reexamination Under 37 C.F.R. §41.68 of US Patent No. 6,496,541, Control No. 95/001,435, filed on Sep. 30, 2013, 12 pages.
Respondents' Brief of Third-Party Requesters in Inter Partes Reexamination of US Patent No. 6,496,541, Control No. 95/001,435, filed on Sep. 20, 2013, 26 pages.

(56) References Cited

OTHER PUBLICATIONS

Patent Owner's Appellant's Brief in Inter Partes Reexamination Under 37 C.F.R. §41.67 of US Patent No. 7,072,665, Control No. 95/001,436, filed on Oct. 1, 2013, 39 pages.
Replacement Cross-Appeal Brief of Third-Party Requesters in Inter Partes Reexamination of US Patent No. 7,072,665, Control No. 95/001,436, filed on Oct. 1, 2013, 15 pages.
Corrected Patent Owner's Appellant's Brief in Inter Partes Reexamination Under 37 C.F.R. §41.67(d) of US Patent No. 7,072,665, Control No. 95/001,436, filed on Oct. 30, 2013, 41 pages.
Patent Owner's Respondent's Brief in Inter Partes Reexamination Under 37 C.F.R. §41.68 of US Patent No. 7,072,665, Control No. 95/001,436, filed on Nov. 1, 2013, 11 pages.
Respondents' Brief of Third-Party Requesters in Inter Partes Reexamination of U.S. Patent No. 7,072,665, Control No. 95/001,436, filed on Dec. 2, 2013, 26 pages.
Office Action for U.S. Appl. No. 14/266,144, mailed on Jul. 16, 2014, 22 pages.
Office Action for U.S. Appl. No. 13/924,903, mailed on May 13, 2014; 6 pages.
Examiner's Answer in Inter Partes Reexamination of U.S. Patent No. 6,385,541, Control No. 95/001,435, mailed on Apr. 3, 2014, 3 pages.
Patent Owner's Rebuttal Brief for Inter Partes Reexamination of U.S. Patent No. 6,385,541, Control No. 95/001,435, filed on May 5, 2014, 15 pages.
Rebuttal Brief of Third-Party Requesters in Inter Partes Reexamination of US Patent No. 6,385,541, Control No. 95/001,435, filed on May 5, 2014, 8 pages.
Decision on Appeal in Inter Partes Reexamination of US Patent No. 6,385,541, Control No. 95/001,435, mailed on Sep. 29, 2014, 40 pages.
Owner's Request for Rehearing Under 37 CFR 41.79 in Inter Partes Reexamination of US Patent No. 6,385,541, Control No. 95/001,435, filed on Oct. 29, 2014, 9 pages.
Third Party Requester's Comments in Opposition to Request for Rehearing under 37 C.F.R. §41.79(c) in Inter Partes Reexamination of US Patent No. 6,385,541, Control No. 95/001,435, filed on Dec. 1, 2014, 7 pages.
Examiner's Answer in Inter Partes Reexamination of U.S. Patent No. 7,072,665, Control No. 95/001,436, mailed on Apr. 4, 2014, 3 pages.
Patent Owner's Rebuttal Brief for Inter Partes Reexamination of U.S. Patent No. 7,072,665, Control No. 95/001,436, filed on May 5, 2014, 16 pages.
Rebuttal Brief of Third-Party Requesters in Inter Partes Reexamination of US Patent No. No. 7,072,665, Control No. 95/001,436, filed on May 5, 2014, 7 pages.
Decision on Appeal in Inter Partes Reexamination of US Patent No. 7,072,665, Control No. 95/001,436, mailed on Sep. 29, 2014, 40 pages.
Owner's Request for Rehearing Under 37 CFR 41.79 in Inter Partes Reexamination of US Patent No. 7,072,665, Control No. 95/001,436, filed on Oct. 29, 2014, 8 pages.
Third Party Requester's Comments in Opposition to Request for Rehearing under 37 C.F.R. §41.79(c) in Inter Partes Reexamination of US Patent No. 7,072,665, Control No. 95/001,436, filed on Dec. 1, 2014, 6 pages.

\* cited by examiner

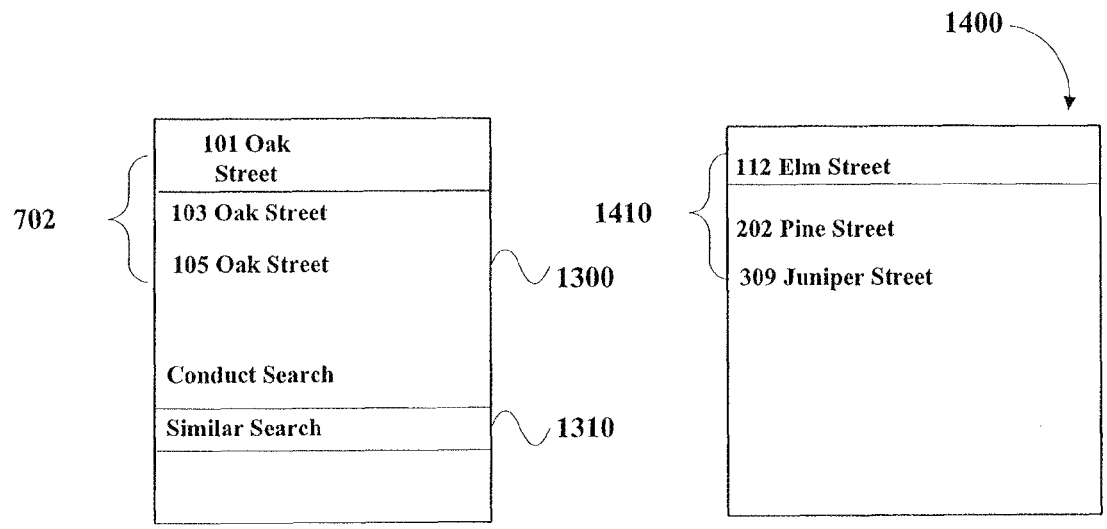
Figure 13
Figure 14
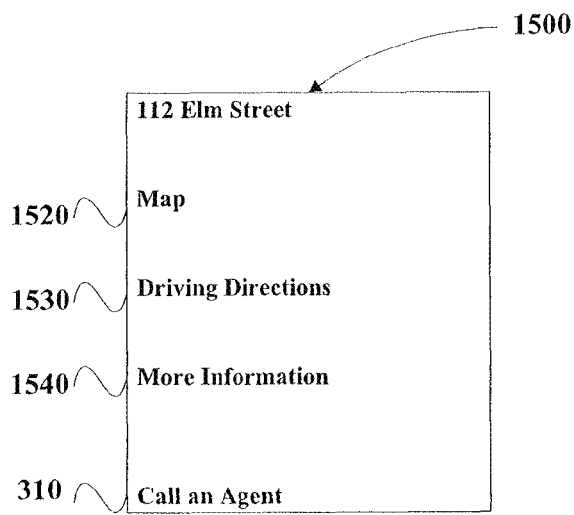
Figure 15

POSITION-BASED INFORMATION ACCESS DEVICE AND METHOD OF SEARCHING

CROSS-REFERENCE TO RELATED APPLICATIONS

This application is a continuation of U.S. patent application Ser. No. 11/426,497, filed Jun. 26, 2006, entitled "Position-Based Information Access Device and Method of Searching," which claims priority to and is a continuation of U.S. application Ser. No. 09/774,119, filed Jan. 31, 2001, entitled "Position-Based Information Access Device and Method of Searching," now U.S. Pat. No. 7,072,665, which claims priority to and is a continuation-in-part of U.S. application Ser. No. 09/639,265, filed Aug. 15, 2000 and entitled "Global Positioning-Based Real Estate Database Access Device and Method," now U.S. Pat. No. 6,385,541, which claims priority to U.S. Application Ser. No. 60/186,155, filed Feb. 29, 2000, entitled "Global Positioning-Based Real Estate Database Access Device and Method," each of the disclosures of which is incorporated herein by reference in its entirety.

BACKGROUND OF THE INVENTION

1. Field of the Invention

The present invention relates to a method and apparatus for accessing and managing property-centric information, and, more particularly to a wireless device that uses positioning data to access such information.

2. Description of the Related Art

People often desire to obtain information about a particular location at which they are located, whether it be a famous or historic landmark, an office building, a business location, a piece of real estate, an airport, a hotel, shopping mall, or a sports arena. The traditional methods of obtaining such information include using printed materials such as guide books, maps, etc., communicating with people knowledgeable about the particular location, and researching the particular location either before or after being physically present at the location.

Such methods of obtaining information may significantly detract from the person's ability to appreciate or experience the location at which they are present. Put more simply, the person may not be able to gather or access enough information about the location because it is not readily available. For example, if a person is visiting a famous landmark at a time when there are no tour guides available and the local gift shop is closed, the person may not be able to obtain valuable information about the landmark. Although the person may be able to get the information later, that isn't always a suitable alternative. Even in the event where a person is able to obtain printed materials, they are often cumbersome to carry around and read through while traveling from place to place. Moreover, as a person visits numerous locations, they tend to accumulate vast amounts of printed materials.

Another example in which location-specific information is not readily obtained is during a search real estate search. The traditional method of buying real estate requires the prospective purchaser to transact through a real estate broker for virtually every aspect of the transaction, from finding a desired property to completing the sale. Often the most difficult part of the process, from the buyer's perspective, is locating a desired piece of real estate. There are generally two methods employed to locate a desired piece of property.

The first method relies solely on the real estate broker to use his or her contacts to locate property that meets the buyer's specifications. The second is more random, in that if a buyer happens to pass a piece of property that is displaying a "for sale" sign, the buyer can write down the phone number shown on the sign to later inquire about the property, which then places the transaction totally within the broker's hands, as the broker controls all the information relating to the property (e.g., size and cost).

People also have a difficult time finding exactly the right features in their house search or have trouble adding exactly the right features to their existing homes. People generally have difficulty finding exactly the right manufacturer or service provider to provide particular features for their home or office. Moreover, it is difficult to find an architect to design a home of the style that a person desires, or to find a landscaper or gardener to achieve a look that a person wants, etc. Most often, people will look in the phone book to get a list of service providers or manufacturers and then end up driving all over town to review samples of various service providers' work.

Over the last few years, various computer-related methods for locating real estate have been introduced. For example, U.S. Pat. No. 5,032,989 relates to a computerized map-based real estate search system in which a user can zoom in on a map to greater levels of detail, in order to obtain a more accurate view of the location of an available piece of property. The mapping system in the '989 patent is centered about a user-selectable landmark, and the different maps that are generated are also centered about the landmark. There is an associated property database that can be accessed remotely either by searching by specified criteria or by using the mapping system. Additionally, U.S. Pat. No. 5,852,810 covers an Internet map-based real estate search system that operates in a similar manner to the '989 patent. The system disclosed in the '810 patent also permits a user to search criteria after narrowing the map-based search down to the city level, thereby allowing a criteria-based search in addition to a location-based search.

When accessing property information via a computer, it is often desirable to view an image of the property at the same time. In this regard, U.S. Pat. No. 5,794,216 is directed to an interactive multimedia real estate database including interior images and exterior images of the selected house, the floor plan of the house, a textual description of the property, etc. Additionally, links are provided on the exterior image of the house that, if clicked, permit the user to view the interior of the corresponding room.

The foregoing patents require a user to be located at a computer, and remote from the property. The technology disclosed in these patents is not effective when a buyer is driving past a particular piece of property and would like additional information about that property. It would be desirable for a prospective buyer to be able to access information relating to a piece of property as the buyer was present at the property, at any time of day, and whether or not the property displayed a "for sale" sign. This type of information is ideally suited to be transmitted via a wireless device.

U.S. Pat. No. 5,930,699 relates to an address retrieval system based on the position of a cellular telephone. A cell phone user can request information relating to businesses that are located in the proximity of the user, based upon the geographic position of the user as determined by pinpointing the location of the cell phone. Once the location of the user is determined, a database that is keyed on geographic location is searched, looking for businesses of the type requested by the user (e.g., restaurants, gas stations, hotels, etc.) that are located in the area around the user.

U.S. Pat. No. 5,938,721 discloses a mobile computer system having a built-in global positioning system (GPS) locator and an associated database that displays relevant information to the user based upon the user's current location. The database is accessed in real time as the user's position changes and is primarily focused on task-based information. For example, if a stored task is to buy milk, as the user approaches the grocery store, he or she is reminded to buy milk. This patent also discusses route planning between multiple stops, as well as a business-locating function similar to that described in the '699 patent.

It will thus be appreciated that it is difficult for a person to obtain information related to a specific location without the person knowing their actual location. It is further difficult for a person to locate information about service providers that contributed to the construction or maintenance of a particular location.

SUMMARY

In an effort to address the aforementioned problems, the embodiments of the present invention strive to provide an apparatus and methods whereby an individual is able to readily obtain location-centric information about a specific physical location via a wireless device.

Other objects, advantages and features associated with the embodiments of the present invention will become more readily apparent to those skilled in the art from the following detailed description. As will be realized, the invention is capable of other and different embodiments and its several details are capable of modification in various aspects, all without departing from the invention. Accordingly, the drawings and the description are to be regarded as illustrative in nature, and not limitative.

BRIEF DESCRIPTION OF THE DRAWINGS

FIG. 13 is an example of a similar search display produced on a wireless device of the system illustrated in FIG. 1.

FIG. 14 is an example of a similar search results display produced on a wireless device of the system illustrated in FIG. 1.

FIG. 15 is an example of a similar search address display produced on a wireless device of the system illustrated in FIG. 1.

DETAILED DESCRIPTION

Figure 1:
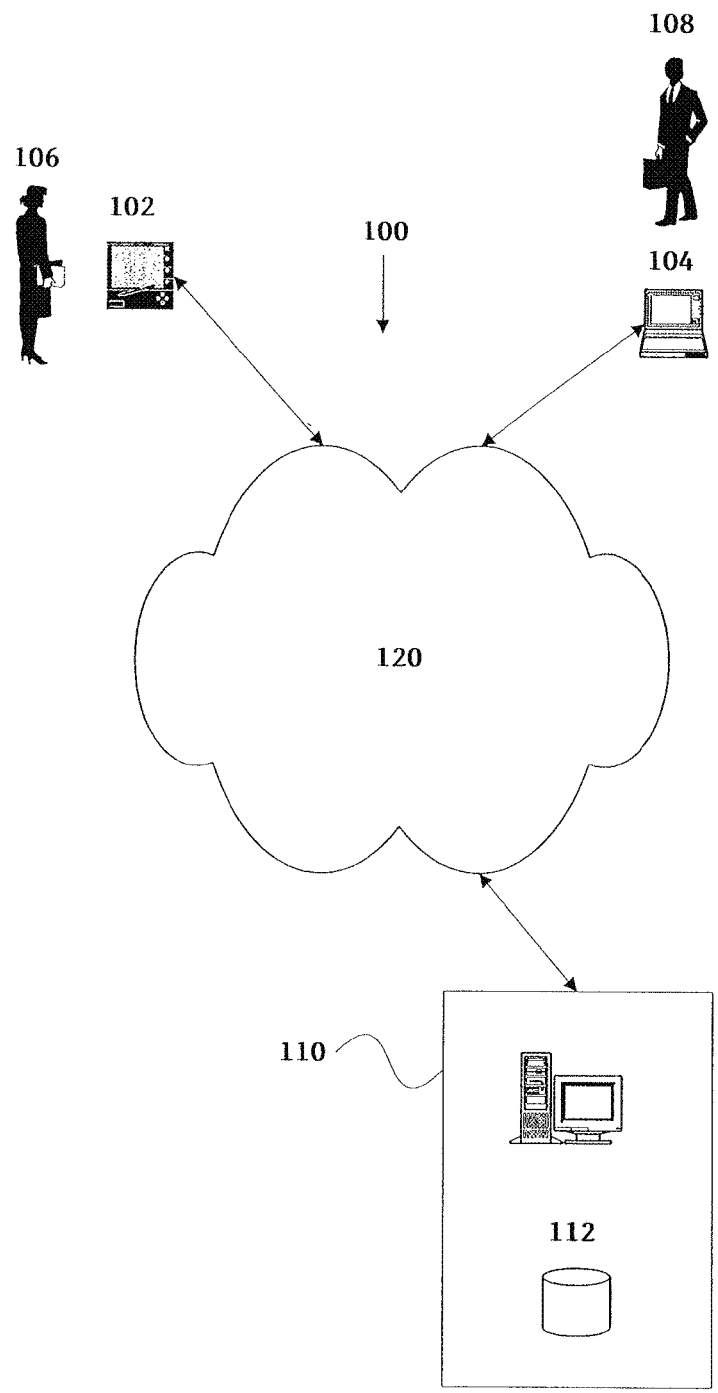
FIG. 1 is a schematic of an information retrieval system in accordance with one embodiment of the present invention.
Figure 2:
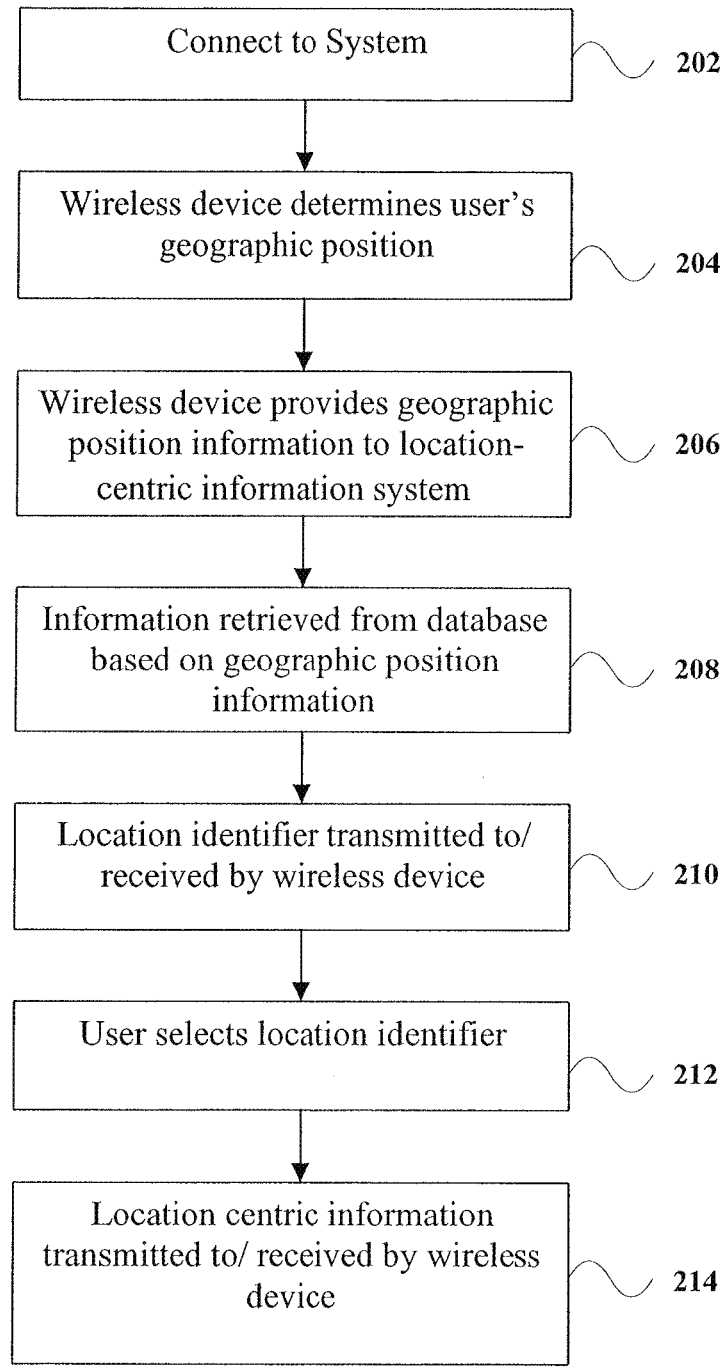
FIG. 2 is a flow diagram illustrating one embodiment of a method according to the present invention.

FIG. 1 illustrates one embodiment of an information retrieval system 100 suitable for implementing the features of the present invention, and FIG. 2 illustrates a flow chart of an exemplary method of the present invention. System 100 includes one or more wireless devices 102 and may also include a computer 104 and a location-centric information system 110 that includes an information database 112. Users 106, 108 may retrieve position-based location-centric information from location-centric information system 110 over a network 120 for use with devices 102, 104.

In one embodiment, wireless device 102 is a hand-held electronic device including a global positioning system (GPS) locator whose location can be pinpointed using known means. In another embodiment, CDMA cellular positioning technology, such as that available from QUALCOMM may be incorporated in device 102. In a further embodiment, wireless device 102 may include a cellular telephone capable of receiving and displaying non-voice data and whose location can be pinpointed using known means. Device 102 may also be a network hybrid device. The types of location methods for use in the present invention may comprise EOA, Time Difference of Arrival (TDOA), Time of Arrival (TOA), GPS cell ID, and network-assisted GPS systems as well as others. While geographic position information may be provided to location-centric information system 110 from wireless device 102, it is also possible for location-centric information system 110 to independently determine the position of wireless device 102. Wireless device 102 may include an automobile-based device that incorporates the telematics principles.

Wireless device 102 and computer 104 are each operable by a user 106, 108 and each include a user input/output, a display, and a memory. Wireless device 102, and computer 104 are each configured to run software to retrieve and view location-centric information from database 112 of location-centric information system 110 over network 120. As described below, a user interface rendered on wireless device 102 and computer 104 also enables users 106, 108 to carry out various activities, including, for example, information retrieval, appointment scheduling, data searches, etc. Hence, wireless device 102 and computer 104 are devices by which each user 106, 108 can download and/or view information related to a landmark at which they are located and retrieve and view the information regarding the particular landmark.

For purposes of the present application, the term landmark may be used to refer to any (1) physical structure such as a residence, apartment, apartment building, detached home, partially detached home, townhouse, condominium, co-op, building, etc.; (2) natural feature such as a body of water, glacier, canyon, cave, mountain, mountain range, etc.; (3) historical feature such as a monument, memorial, statue, battle field, historic location, park, trail, etc.; or (4) commercial feature such as a stadium, arena, school, shopping mall, strip mall, store, grocery store, parking garage, airport, hotel, inn, hostel, camp ground, car dealer, car rental establishment, hospital, etc.

Suitable implementations of wireless devices 102 and computer 104 include devices such as laptop computers, wireless telephones, portable workstations, personal data assistants ("PDA's"), pagers, and various other portable electronic communication devices capable of carrying out similar activities. Where wireless device 102 is a PDA or similar device, user 106 may utilize conventional methods to provide input. Where wireless device 102 is an automobile-based device, user 106 may utilize manual methods or voice commands to provide input to wireless device 102. In such a situation, wireless device 102 is equipped with voice-recognition software known in the art.

Network 120 may be any form of interconnecting network including an intranet, such as a local or wide area network, or an extranet, such as the World Wide Web or the Internet. Network 120 can be physically implemented on a wireless or wired network, on leased or dedicated lines, including a virtual private network (VPN). Communications network 120 can be any type of communications network, such that computer 104 and wireless device 102, whether a hand-held electronic device or a cellular telephone, can both access location-centric information system 110 to retrieve and view information from database 112. The present invention may be used in conjunction with a wireless operating system such as the Wireless Application Protocol (WAP).

In one embodiment, system 100 is a WINDOWS based system. In another embodiment, system 100 is a PALM based system. In yet a further embodiment, system 100 is a UNIX based system. System 100 may also be internet-based and generate web-browser and web page data, such as HTML, JavaScript, Java applets, etc.

While the present invention may be used in conjunction with any of the categories of landmarks described above, it may be used in a real estate context. Many of the examples illustrated herein relate to use of the present invention with respect to real estate. However, the present invention is applicable to any of the landmarks described above.

Database 112 may be an ODBC-compliant database, such that it is accessible via a variety of database programs. Database 112 may include a variety of different location-centric information regarding each landmark stored therein. Database 112 may also include textual data and a voice description of a landmark at a particular location, such that this information can be retrieved by either wireless device 102 or computer 104. Database 112 may also include photographs of the property, floor plans of any buildings on the property (in two-dimensional and three-dimensional views), animation, or video footage of the property, representing a virtual walk-through of the property. The accessibility of these graphical elements of database 112 may be dependent upon the display capabilities of the receiving device. In one embodiment of the present invention, database 112 may be used in connection with a multiple listing service (MLS) to provide information on as large a number of properties as possible.

Accordingly, although location-centric information system 110 may store information related to real estate, it may store other information as well. The information may be stored in a single database 112 or multiple databases. For example, location-centric information system 110 may store any combination of information regarding any of the following in any number of databases 112. Location-centric information system 110 may include information regarding single family homes, condominiums, town houses, apartments, historic buildings, monuments, memorials, parks, statues, bodies of water, mountain ranges, canyons, trails, etc. The location-centric information system 110 may further include information regarding office buildings, including directories, occupants/tenants, floor plans, lease data/availability, specifications, services offered in the building, etc. Location-centric information system 110 may further include information regarding business locations such as retail outlets, and restaurants, including information about services offered, menus, prices, etc. Location-centric information system 110 may also include information regarding airports, including maps, flight information, parking information, retail information, etc. Location-centric information system 110 may also include information regarding hotels including room availability, rates, historical information, directories, etc. Location-centric information system 110 may include information related to shopping malls including directory information, maps, operating hours, parking information, etc. Location-centric information system 110 may also include information regarding sports arenas such as seating diagrams, concessions available, services offered, etc. Location-centric information system 110 may include any information about any location that may be provided by a representative of the particular location to be included in database 112 or that may be independently entered into database 112 by a party not affiliated with the particular location.

Any one of or combinations of the above-described information stored by database 112 may be communicated to wireless device 102, and computer 104 over network 120 in the manner described in greater detail below.

The following description of the operation of system 100 includes the function and interaction of user 106 and wireless device 102 with the remainder of system 100 illustrated in FIG. 1. However, it is to be understood that the following description is equally applicable to user 108 and computer 104, and multiple other users and wireless devices, or portable computers not illustrated in FIG. 1.

One method of the present invention will now be described in reference to FIG. 2. As will be apparent, the operations illustrated in FIG. 2 need not occur in the illustrated order. As illustrated by FIG. 2, at an operation 202, wireless device 102 may be connected to location-centric information system 110 via network 120 according to known methods. At an operation 204, user's 106 location (i.e., geographic position, latitude/longitude) is determined using one of the methods described above. At an operation 206, wireless device 102 provides the geographic position information to location-centric information system 110.

In an operation 208, location-centric information system 110 may retrieve location-centric information from database 112 based on the geographic position information provided by wireless device 102. In one embodiment, location-centric information system 110 also retrieves a location identifier from database 112. A location identifier is an indicator associated with a particular landmark. The location identifier is representative of a landmark located at the geographic position associated with wireless device 102 and may take any of a variety of forms. For example, a location identifier may be a street address of a residential unit (e.g., house, condominium, etc.) at which user 106 is located. Alternatively, the location identifier may be a video image such as a picture or other graphical representation of the landmark at which user 106 is located. Further, the location identifier may be a video or audio representation of the landmark at which user 106 is located. Location-centric information is that information related to the location identifier. The location-centric information is that information described above as being stored in database 112 and may also include information available over network 120 that is related to a location identifier such as detailed residential unit information including house description, sale price, etc.

Figure 3:
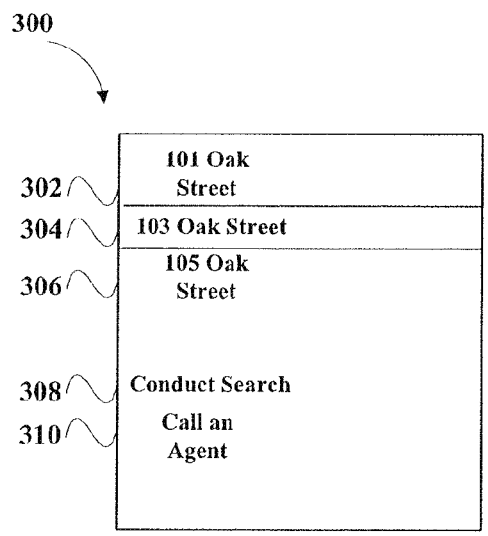
FIG. 3 is an example of a location identifier display produced on a wireless device of the system illustrated in FIG. 1.

In an operation 210, a location identifier is transmitted to, and ultimately received by, wireless device 102. Alternatively, a plurality of location identifiers may be transmitted to wireless device 102. FIGS. 3-13 illustrate exemplary displays that may be viewed by user 106 accessing system 100 of the present invention in the search for a particular piece of real estate. As illustrated in FIG. 3, wireless device 102 presents a location identifier display 300 for viewing by user 106. Location identifier display 300 may be an interactive display viewed by user 106 when user 106 desires to import location-centric information to wireless device 102 from location-centric information system 110. Hence, wireless device 102 may include computer executable software code stored on a computer readable medium of wireless device 102 for prompting user 106 to select the appropriate location identifier to retrieve the appropriate location-centric information from location-centric information system 110 to wireless device 102. User 106 can interact with the display using a keyboard, a touch screen, a microphone, etc. In one embodiment, location identifier display 300 presents interactive links 302, 304, 306, 308, 310 that user 106 may use to import or retrieve the desired location-centric information from location-centric information system 110, or perform some other function using location-centric information system 110 as will be described. Interactive links 302, 304, 306, 308, 310 may include a location identifier.

Other interactive links may be provided for various functions such as searching database 112 as will be described below. For example, as illustrated in FIG. 3, location identifier display 300 also includes a conduct search icon 308, which permits user 106 to perform a search of database 112 and a "Call Agent" icon 310 which allows user 106 to contact a person with greater knowledge of the particular location.

In the embodiment illustrated in FIG. 3, interactive links 302, 304, 306 include location identifiers in the form of street addresses. In this embodiment, a plurality of location identifiers 302, 304, 306 may be included when the location-centric information system 110 is unable to attribute the geographic position of wireless device 102 with a particular landmark. This may occur, for example, when a geographic position corresponds to several entries in database 112. In such a case, location-centric information system 110 provides the possible location identifiers corresponding to the several entries within a predetermined or random radius of the geographic position of wireless device 102. For example, if user 106 is located on a street in front of several houses, location-centric information system 110 may provide location identifiers indicating the street address of the houses in the general vicinity. More specifically, as illustrated in FIG. 3, when user 106 is located, for example, in front of "103 Oak Street" location-centric information system 110 may provide location identifiers of "101 Oak Street," "103 Oak Street," and "105 Oak Street." As mentioned above, the location identifiers may also take the form of graphic images of the houses provided wireless device 102 is capable of providing such a display.

In another example, if user 106 is located in the Grand Canyon and desires to retrieve information about the Canyon, the location identifiers that may be provided may relate to the direction user 106 is facing (e.g., North, South, West, East). When user 106 selects the appropriate location identifier, location-centric information may be provided based on the direction user 106 is facing.

Geographic position information of wireless device 102 may be attributed to a distinct landmark within location-centric information system 110. In that case, location-centric information system 110 may only transmit to wireless device 102 a single location identifier. In such an embodiment, user 106 would then select the single location identifier. In another embodiment, location-centric information system 110 may provide a plurality of location identifiers 302, 304, 306, but may highlight the location identifier that is attributed to the distinct landmark as shown at 304. In this manner, user 106 may actively choose from alternative location identifiers 302, 306. In a further embodiment, where a precise location is provided to location-centric information system 110 from wireless device 102, location-centric information system 110 may transmit to wireless device 102 only location-centric information relevant to the particular location without user 106 ever actively selecting the location identifier. In such a situation, user 106 may be passively selecting the appropriate location identifier by virtue of user's 106 position with respect to the particular location.

When presented with a location identifier 302, 304, 306, user 106, in an operation 212, user 106 selects the appropriate location identifier. Upon selecting the location identifier, location-centric information system 110 transmits location-centric information related to the selected location identifier to wireless device 102. In those embodiments where in location identifier is transmitted, location-centric information system 110 transmits location-centric information to wireless device 102 when the distinct landmark is identified.

Figure 4:
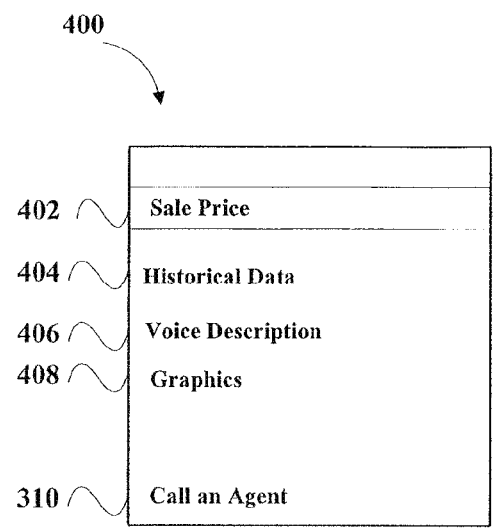
FIG. 4 is an example of an information search display produced on a wireless device of the system illustrated in FIG. 1.

When wireless device 102 receives the location-centric information in an operation 214, user 106 is able to manipulate the location-centric information to obtain location-centric information relevant to user 106. For example, FIG. 4 illustrates an example of a location-centric information search display 400 viewed by user 106 upon receiving location-centric information. Location-centric information search display 400 may include a menu or list of icons with selections 402, 404, 406, 408, 410 for user 106 to choose from to obtain more narrowly tailored or focused information about the particular place at which they are located. In the illustrated embodiment of a user accessing system 110 for a real estate transaction, such information may include sale price 402, historical data 404, voice description 406, and graphics 408. The list can be expanded beyond these four options as would be apparent. Selecting sale price item 402 may present to user 106 the current sale price for the property, as will be discussed below. Choosing historical data item 404 may present user 106 with the historical sale prices for the property in order to assess the property's appreciation over time. Selecting voice description option 406 may play back a spoken description of the property. Finally, selecting graphics item 408 may display any available graphics (e.g., floor plans, exterior or interior views, or walk-throughs) relating to the property.

Figure 5:
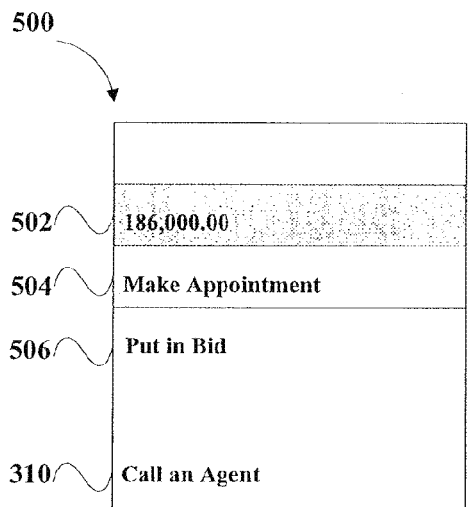
FIG. 5 is an example of a data retrieval display produced on a wireless device of the system illustrated in FIG. 1.
Figure 6:
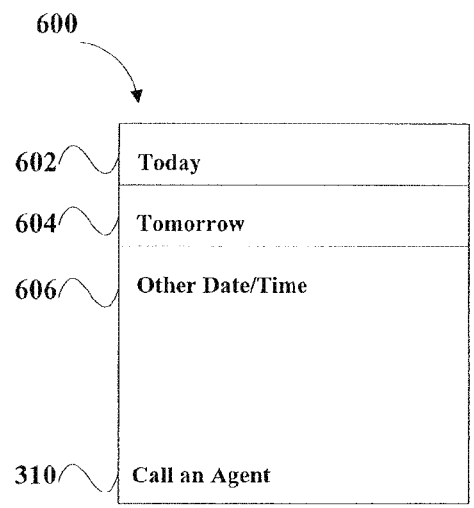
FIG. 6 is an example of an appointment display produced on a wireless device of the system illustrated in FIG. 1.

If user 106 selects one of items 402, 404, 406, 408, 410 from search display 400, a data retrieval display 500 may be displayed, an example of which is illustrated in FIG. 5. Data retrieval display 500 can include more detailed information 502 and action icons 504, 506, 510 which enable user 106 to take action based on detailed information 502 regarding the particular location at which user 106 is located. Referring to the illustrated embodiment, when user 106 selects sale price icon 402, sale price 502, an option to make an appointment 504 to view the property, and the ability to place a bid 506 on the property may be displayed.

Where user 106 chooses an action icon 504, 506, 510, user 106 may be presented with a display 600 that may allow user 106 to take some action with respect to the property at which user 106 is located. In the illustrated embodiment, assuming user selects make appointment item 504, an appointment display 600 is viewed by user 106 as illustrated in FIG. 6. From appointment display 600, user 106 can choose from pre-selected appointment times such as today 602, tomorrow 604, or schedule a different appointment time 606. If user 106 selects bid item 506, user 106 will be prompted to enter a bid amount, which will be transmitted back to database 112. In this manner, user 106 is able to interact with database 112.

Figures 7, 8:
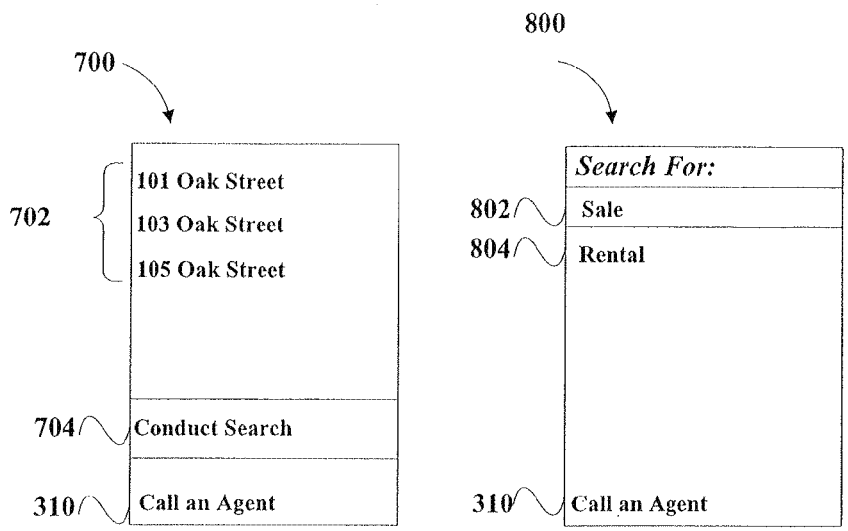
FIG. 7 is an example of a search initiation display produced on a wireless device of the system illustrated in FIG. 1.
FIG. 8 is an example of a search selection display produced on a wireless device of the system illustrated in FIG. 1.

FIGS. 7-12 illustrate various exemplary displays on wireless device 102 that may be viewed by user 106 when user 106 desires to search for a particular landmark (i.e., building, property, park, body of water, etc.). FIG. 7 illustrates a search initiation display 700 shown after user's 106 location has been determined using one of the methods described above. Search initiation display 700 may be similar to location identifier display 300 illustrated in FIG. 3 provided location identifier display 300 includes a conduct search icon 308 as illustrated. Search initiation display 700 allows user 106 to search database 112 for more detailed information as will be described. In the illustrated embodiment of user 106 conducting a real estate transaction, search initiation display 700 includes a list 702 of street addresses of properties adjacent to the particular property in which user 106 is concerned, and a conduct search icon 704. If user 106 desires assistance at any time during the search process, user 106 may select call agent item 310, and user 106 will be connected to an operator or recording that may provide additional instruction or information. Such a feature may be available whether user 106 is using wireless device 102 to conduct a real estate transaction or any other type of transaction. Call agent item 310 is accessible from any of the displays described.

Figures 9, 10:
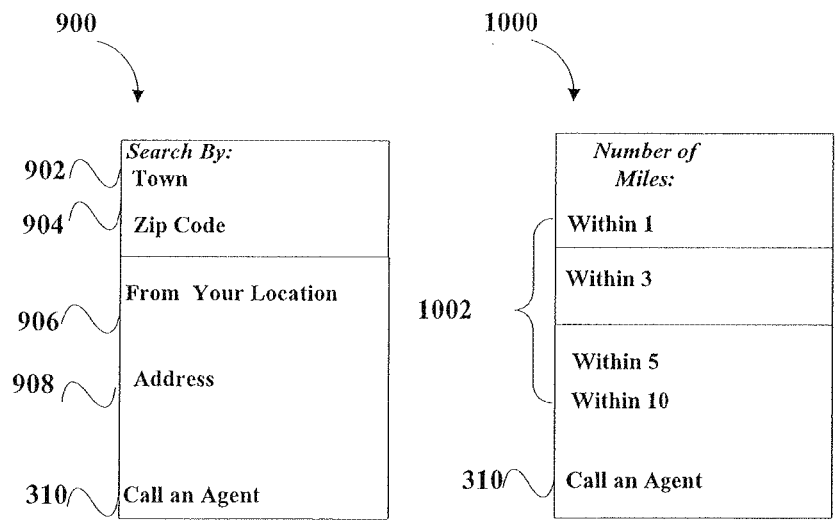
FIG. 9 is an example of a criteria selection display produced on a wireless device of the system illustrated in FIG. 1.
FIG. 10 is an example of a transaction type display produced on a wireless device of the system illustrated in FIG. 1.

User 106 enters the search process after selecting conduct search item 704 from search initiation display 700. A search selection display 800, illustrated in FIG. 8, can then viewed by user 106. Search selection display 800 allows user 106 to choose from broad categories of selection criteria. For example, in the illustrated embodiment, where user 106 is interested in real estate, they may be given the option of searching for properties to either rent or buy. User 106 may be presented with selection icons 802, 804 to prompt the database to narrow the search to a particular category. As illustrated in FIG. 9, user 106 may be presented with a criteria selection display 900 that allows user 106 to further define the search criteria within the chosen category based on the chosen selection icon 802, 804 from search selection display 800. Criteria selection display 900 includes search criteria or search options 902, 904, 906, 908. In the illustrated embodiment, criteria selection display 900 includes a menu of search options, including search by town 902, search by zip code 904, search by present location 906, and search by street address 908.

Upon making a selection from criteria selection display 900, user 106 may then be presented with a transaction type display 1000 that allows user 106 to define the specific criteria chosen from criteria selection display 900 by using a selection list 1002. In the illustrated embodiment, assuming that user 106 chooses search by present location item 906, a transaction type display 1000 is viewed, from which user 106 can narrow the geographic scope of the search by selecting, for example, a predefined radius 1002.

Once user 106 defines the specific search criteria, user 106 may be presented with a narrow search display 1100, to further narrow the search results within the specific criteria by choosing from a selection list 1102 of narrowing criteria. In the illustrated embodiment, user 106 selects, for example, the price range for the property from a list of price ranges 1102. The list of narrowing criteria may include any criteria that would narrow the search results retrieved. For example, the criteria could include features such as number of bedrooms, number of bathrooms, square footage, location (i.e., near a golf course, near a lake, etc.).

Figures 11, 12:
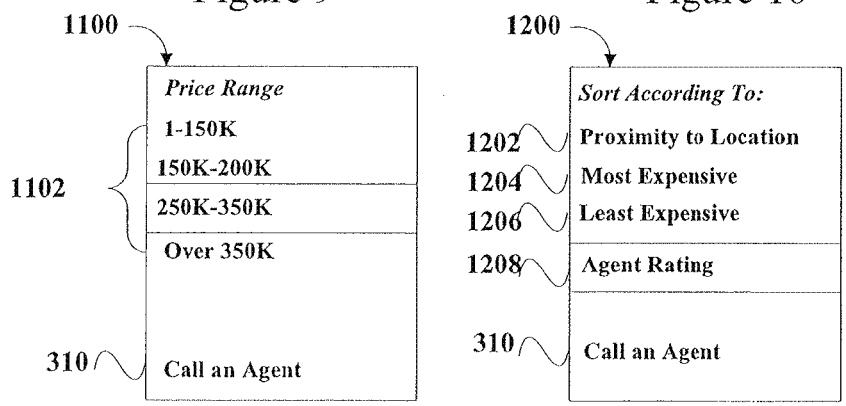
FIG. 11 is an example of a narrow search display produced on a wireless device of the system illustrated in FIG. 1.
FIG. 12 is an example of a data presentation display produced on a wireless device of the system illustrated in FIG. 1.
Figure 16:
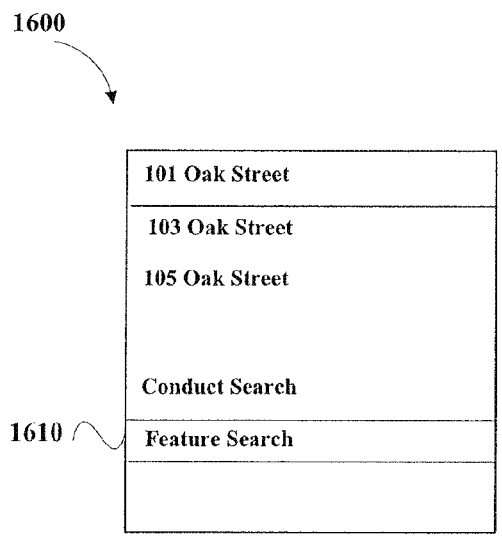
FIG. 16 is an example of a feature search display produced on a wireless device of the system illustrated in FIG. 1.

FIG. 12 illustrates a data presentation display 1200 that permits user 106 to select the order in which the search results are to be presented. User 106 may be given options 1202, 1204, 1206, 1208 to choose from. In the illustrated embodiment, the results can be sorted by proximity to user's 106 present location 1202, in descending order starting with the most expensive property 1204, in ascending order beginning with the least expensive property 1206, and by property rating 1208. The property rating 1208 is a proprietary rating determined on the basis of the condition of the property, the location of the property, and the list price of the property.

There may be an infinite number of displays and search criteria screens that allow user 106 to narrow or expand their search for a particular landmark. The present invention is not limited to the number of search screens illustrated and disclosed above. For example, in another embodiment of the invention, there may be a single search screen without the ability to define search criteria. In another embodiment, user 106 may be able to decide to what extent they desire to narrow the search and execute the search prior to viewing all of the criteria narrowing search screens described above.

The embodiments described above allow user 106 to retrieve information about a particular landmark near which they are located. If a person is looking for a house, apartment, or other property to rent or purchase, the property near which they are located may not be for sale or rent. But the person may like some of the features of the home or the general design. In that case, the person would benefit from knowing similar properties in the area that are for sale or rent.

In the embodiment illustrated in FIGS. 13-15, it is possible for user 106 to search for a landmark that has similar features or attributes as a landmark in front of which user 106 is located. In such a situation, user 106 may view similar search display 1300 that includes a similar search icon 1310. For example, if user 106 is located in front of a home that is not for sale, but user 106 would like to purchase a similar home, by choosing the appropriate location identifier 702, and similar search icon 1310, location-centric information system 110 may provide multiple location identifiers or addresses 1410 of second homes that are for sale having similar attributes to the first home. The results may be displayed in a similar search results screen 1400. When user 106 is presented with similar search results screen 1400 with multiple location identifiers 1410, user 106 may then choose a single location identifier or address about which to obtain more detailed information. User 106 may then be presented with a similar search address display 1500. From similar search address display 1500, user 106 may choose to receive a map 1520 to the second home, driving directions 1530 to the second home, and more information 1540 about the second landmark (e.g., sale price, school district, days on market, etc.). The search criteria may be more narrowly defined as described above with reference to FIGS. 7-12 such that only similar homes for sale within a certain radius, price range, etc. are shown.

User 106 may choose which attributes of the home in which they are interested to tailor the search to only include homes for sale that include that particular attribute. For example, if user 106 likes the style of the home (e.g., colonial, split-level) then user 106 may narrow the search criteria to only search for similar homes of a particular style.

The attributes contained in location-centric information system 110 include, but are not limited to, home style, parcel lot size, number of floors, number of bedrooms, number of bathrooms, roof style, window style, architect, builder, landscaping, garage features, kitchen features, flooring features, utility features, color, size, etc.

Figure 17:
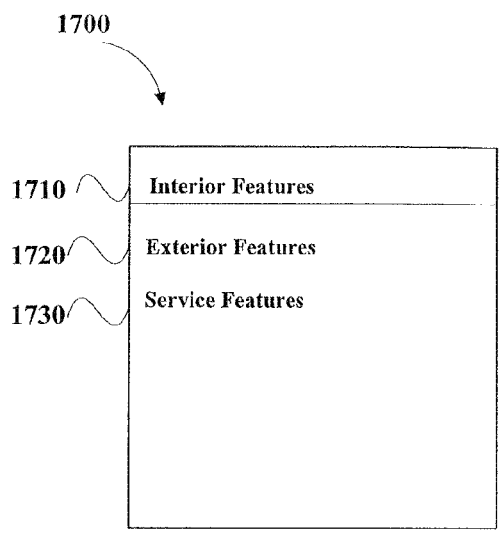
FIG. 17 is an example of a feature selection display produced on a wireless device of the system illustrated in FIG. 1.

User 106 may also obtain detailed information about a particular attribute of a landmark in which they are interested. Referring to FIGS. 16-19, user 106 may be located in front of a landmark that has a particular feature (e.g., landscaping, windows, door, design) in which user 106 is interested. In such a situation, user 106 may view a feature search display 1600 that includes a feature search icon 1610. Upon choosing feature search icon 1610, user 106 views a feature selection display 1700 as illustrated in FIG. 17. Feature selection display 1700 allows user 106 to select the type of feature of interest such as interior feature 1710, exterior feature 1720, or service feature 1730. Interior features may include such features as lighting fixtures, plumbing fixtures, flooring, wallpaper, window treatments, molding, appliances, etc. Exterior features may include such features as roof type, windows, siding, shingles, etc. Service features may include such features as landscaping, gardening, sprinkler systems, pool care etc.

Figure 18:
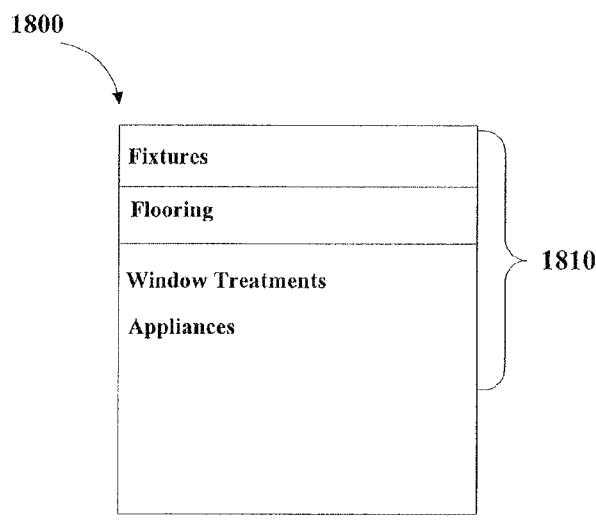
FIG. 18 is an example of a narrow feature selection display produced on a wireless device of the system illustrated in FIG. 1.
Figure 19:
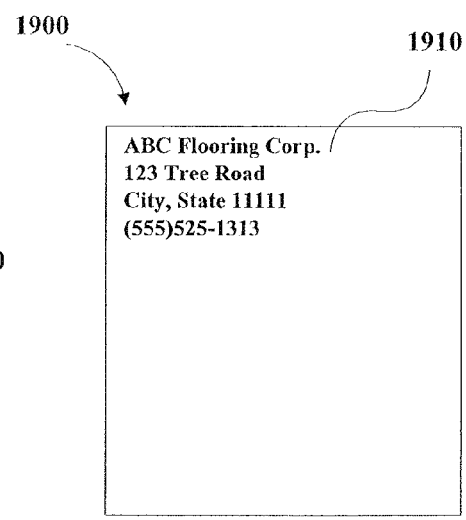
FIG. 19 is an example of a feature detail display produced on a wireless device of the system illustrated in FIG. 1.

When user 106 selects a feature 1710, 1720, 1730, user 106 can view the narrow feature selection display 1800 as illustrated in FIG. 18. From narrow feature selection display 1800, user 106 selects the particular feature of interest from a list of features 1810. The illustrated example includes interior features, but may also include exterior features and service features as apparent. Upon selecting a particular feature, user 106 may be presented with a feature detail display 1900 that includes detailed feature information 1910. The detailed feature information includes specific information about the chosen feature of the particular landmark. The specific information may include contact information for service providers that either manufacture, sell, repair, etc. the particular feature. The detailed feature information may also include contact information for the architect that designed the landmark, service providers related to the landmark, etc. User 106 may desire to view another landmark including similar features as the landmark of interest. In such a situation, user 106 may be presented with similar search results screen 1400 and similar search address display 1500 as described above. In another embodiment, only features for which the location-centric information system has information are provided in the feature list 1810.

For example, if user 106 approached a house that had a certain color and style of brick that was desirable, user 106 would select feature search icon 1610. They would then choose exterior feature 1720 to obtain list 1810 that includes various exterior features. Upon selecting bricks or siding from list 1810, user 106 may be presented with detailed feature information. For example, the detailed feature information may include the manufacturer name, the specific manufacturer specifications for the particular bricks on the home of interest, contact information for the manufacturer, retailers that provide the particular product or similar products, contact information for those retailers, prices of the product, the particular mason or mason-sub-contractor that installed the brick, and other information associated with the brick could be provided or would be apparent etc. Contact information may be provided for particular categories of retailers or manufacturers. For example, in the present embodiment, where user 106 selected bricks from list of features 1810, detailed information regarding retailers and manufacturers of "building products" would be provided in detailed feature information 1910. Such detailed feature information 1910 could be provided for categories of service providers as well.

In another embodiment retailers and manufacturers advertise on location-centric information system 110. When user 106 selects a particular feature from list of features 1810, they may be presented with manufacturers, retailers, or service providers that provide the particular product or similar products or related services, but only if that manufacturer, retailer or service provider advertises on location-centric information system 110. The advertisement may be a paid advertisement or may be provided as a free service for simply registering with the provider of location-centric information system 110.

The principles, preferred embodiments, and modes of operation of the present invention have been described in the foregoing description. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

We claim:

1. A method of retrieving location-centric information, comprising:
   providing information from a handheld wireless device to an information system located remote from the handheld wireless device, the information related to a geographic position of said handheld wireless device, said information system including information associated with a plurality of landmarks for sale;
   receiving at said handheld wireless device from said information system data associated with a plurality of icons, each icon from the plurality of icons being configured to initiate a search for a landmark for sale from the plurality of landmarks for sale within a predetermined radial distance from the geographic position of said handheld wireless device;
   receiving at said handheld wireless device location-centric information from said information system, said location-centric information related to a landmark for sale located proximate to said geographic position of said handheld wireless device within the predetermined radial distance, said location-centric attribute information including indicia of a plurality of features related to said landmark for sale;
   sending to said information system from said handheld wireless device a selection of a feature from said plurality of features; and
   after sending the selection, receiving at said handheld wireless device location-centric detailed feature information related to said selected feature.

2. The method of claim 1, wherein said receiving location-centric detailed feature information includes receiving product information related to said selected feature.

3. The method of claim 1, wherein said receiving location-centric attribute information includes receiving attribute information related to at least one of an interior feature, an exterior feature or a service feature related to said landmark for sale.

4. The method of claim 1, wherein the geographic position is outside said landmark for sale.

5. The method of claim 1, further comprising:
   receiving from said information system at least one location identifier representative of said landmark for sale based on said geographic position.

6. The method of claim 1, wherein said handheld wireless device is a mobile wireless telephone.

* * * * *